United States Patent [19]
Periyalwar et al.

[11] Patent Number: 6,018,662
[45] Date of Patent: Jan. 25, 2000

[54] METHOD FOR PERFORMING PROGRESSIVE SOFT HANDOFF IN CDMA SYSTEMS

[75] Inventors: Shalini Periyalwar, Ottawa; Andy McGregor, Kanata, both of Canada

[73] Assignee: Nortel Networks Corporation, Montreal, Canada

[21] Appl. No.: 09/149,148

[22] Filed: Sep. 8, 1998

[51] Int. Cl.[7] .................................................. H04B 1/67
[52] U.S. Cl. .......................... 455/442; 455/436; 375/200; 370/331; 370/335; 370/468
[58] Field of Search ............................ 455/436, 437, 455/438, 439, 442, 443, 524, 525, 72, FOR 101; 375/200; 370/335, 342, 331, 332, 333, 465, 468

[56] References Cited

U.S. PATENT DOCUMENTS

| 5,864,578 | 1/1999 | Yuen | 375/200 |
| 5,923,650 | 7/1999 | Chen et al. | 370/331 |

*Primary Examiner*—Lee Nguyen
*Attorney, Agent, or Firm*—Cobrin & Gittes

[57] ABSTRACT

Methods and apparatus for progressive soft handoff of a mobile user from one basestation to another in multi-channel CDMA systems provide for progressively decreasing the data rate between the mobile user and a "home" basestation while simultaneously progressively increasing the data rate between the mobile user and the "new" basestation.

10 Claims, 1 Drawing Sheet

METHOD FOR PERFORMING PROGRESSIVE SOFT HANDOFF IN CDMA SYSTEMS

FIELD OF THE INVENTION

The invention relates generally to the field of code division multiple access (CDMA) wireless communications systems, and more particularly, to a method of performing progressive soft handoff of voice, video, data, broadband or other communications in CDMA telecommunications systems using multiple channels.

BACKGROUND OF THE INVENTION

CDMA is a wireless telecommunications technology in which basestations communicate with mobile units over a common bandwidth using quasi-orthogonal spreading codes to define individual communications channels. Such systems utilize "forward" and "reverse" traffic channels. A "forward" traffic channel carries traffic from a basestation to a mobile unit. A "reverse" channel carries traffic from the mobile unit to a basestation.

In a CDMA system, because different channels transmitting in the same direction share the same bandwidth, the communications signals on the various channels interfere with each other and contribute to an overall system interference level. CDMA system capacity, or the number of active mobile units that can be supported within a given system bandwidth, is limited by acceptable system interference level.

Further, in cellular telecommunications systems such as CDMA, as a mobile unit travels from one cell to another, service between the mobile unit and a given basestation (or basestations) must be transferred to one or more "new" basestations. This transfer process is termed "handoff." Handoff is normally triggered by some threshold mechanism related to received signal strength, call quality, system loading, or other system parameters.

Handoffs can be "hard" or "soft". A "hard" handoff is characterized by substantially simultaneous termination of communications with the "old" basestation and initiation of communications with the "new" basestation. The mobile unit is in communication with only one basestation at a time.

In a conventional "soft" or "make-before-break" handoff, the mobile unit and one or more "new" basestations establish communications with each other before communications with the "old" basestation (or basestations) are interrupted. Soft handoffs provide the advantage of "space diversity"—utilization of signals from geographically distributed locations during handoff—thereby improving signal coverage and quality.

However, during a soft handoff, since the mobile unit exchanges signals with multiple basestations, the handoff requires the allocation of resources from multiple basestations. The provision of multiple signals also generates additional interference for other links.

Thus, the advantages of soft handoff are attained at the expense of increased backhaul requirements, greater bandwidth (for the air interface) and processor utilization. With high speed or wideband data such as video, the "cost" of multiple links becomes much more significant than with voice.

By way of example, the IS-95 Standard promulgated by the Telecommunications Industry Association and the Electronic Industries Association (TIA/EIA/IS-95) sets forth parameters for operation of conventional CDMA cellular telecommunications systems. As a design objective, the IS-95 specifies a 2-way soft handoff zone at 30% of the service area, and a 3-way soft handoff zone at 10% of the service area. This requires allocation of 40% of system resources (radios, processors and other channel elements) to handoff, which could be otherwise used to support more traffic.

Accordingly, there exists a need for methods and systems that optimize bandwidth and processor usage during CDMA soft handoff.

It is therefore an object of the present invention to provide methods and apparatus that optimize bandwidth and processor usage in CDMA systems during soft handoff.

It is another object of the invention to provide such methods and apparatus that reduce the impact of power fluctuations caused by entry and exit of wideband users during soft handoff.

It is a further object of the invention to provide such methods and apparatus that reduce interference to other users during soft handoff.

These and other objects of the invention will become apparent to those skilled in the art from the following description.

SUMMARY OF THE INVENTION

The invention will next be described in connection with certain illustrated embodiments and practices. However, it will be clear to those skilled in the art that various modifications, additions and subtractions can be made without departing from the spirit or scope of the claims.

In one aspect, the invention provides a progressive soft handoff method for use in a CDMA telecommunications system having a plurality of basestations and a mobile unit in 2-way soft handoff communication with two of the basestations over first and second respective communications links. The first and second communications links carry digital signals at respective first and second data rates.

In accordance with this practice of the invention, the soft handoff method includes the steps of maintaining, at an initial time during 2-way soft handoff, a full data rate between the mobile unit and the first basestation; establishing, at the initial time, the second communications link at a data rate lower than the full data rate; after the initial time and during 2-way soft handoff, progressively decreasing the data rate between the mobile unit and the first basestation; after the initial time and during 2-way soft handoff, progressively increasing the data rate between the mobile unit and the second basestation; at a termination time defining a termination of 2-way soft handoff, terminating communications between the mobile unit and the first basestation; and at the termination time, providing communications between the mobile unit and the second basestation at the full data rate, thereby progressively transferring communications with the mobile unit to the second basestation. (Note that the term "initial time," as used herein, refers to the start of handoff, rather than to the start of a call. Similarly, the phrase "termination time," as used herein, refers to the end of handoff, rather than to the termination of the call.)

In a further aspect of the invention, the step of maintaining a full data rate between the mobile unit and the first basestation at the initial time during 2-way soft handoff includes the step of providing multiple communications channels in the communications link between the mobile unit and the first basestation at the initial time; the step of progressively decreasing the data rate between the mobile unit and the first basestation includes the step of progressively releasing communications channels between the mobile unit and the first basestation; and the step of progressively increasing the data rate between the mobile unit and the second basestation includes the step of progressively adding, within the second data link, communications channels between the mobile unit and the second basestation. The term "releasing," as used herein, refers to "de-allocation" of channels previously allocated to a call by a given basestation. Those skilled in the art sometimes refer to such a "de-allocation" process as "tearing down" channels.

In a further aspect of the invention, the step of providing multiple communications channels in the communications link between the mobile unit and the first basestation at the initial time includes the steps of encoding the digital signals communicated between the mobile unit and the first basestation into a plurality of digital data components including at least most-significant and least-significant digital data components, allocating at least one communications channel in the communications link between the mobile unit and the first basestation for carrying each of the digital data components, and allocating for the most-significant digital data component at least a first communications channel in the communications link between the mobile unit and the first basestation. The step of progressively releasing communications channels between the mobile unit and the first basestation includes the steps of first releasing a communications channel carrying a least-significant data component, and progressively releasing communications channels carrying progressively more-significant data components, until only the at least one communications channel carrying the most-significant data component remains. At the termination time, the at least one communications channel carrying the most-significant data component is released.

Data compression, rate adaptation, and code puncturing methods can be employed to obtain data rate control.

The invention can also be utilized to provide progressive soft handoff method for use in a CDMA telecommunications system having a plurality of basestations and a mobile unit in 3-way soft handoff communication with three of the basestations over first, second and third respective communications links, the first, second and third communications links carrying digital signals at respective data rates.

In this aspect of the invention, the soft handoff method includes the steps of maintaining, at an initial time during 3-way handoff, a full data rate between the mobile unit and the first basestation; establishing, at the initial time, the second and third communications links at data rates lower than the full data rate; progressively decreasing the data rate between the mobile unit and the first basestation during 3-way soft handoff; progressively increasing the respective data rates between the mobile unit and the second and third basestations; and at a termination time, terminating communications between the mobile unit and the first basestation, and providing communications between the mobile unit and one of the second or third basestations at the full data rate, thereby progressively transferring communications with the mobile unit to one of the second or third basestations.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which.

DETAILED DESCRIPTION OF THE INVENTION

Figure 1:
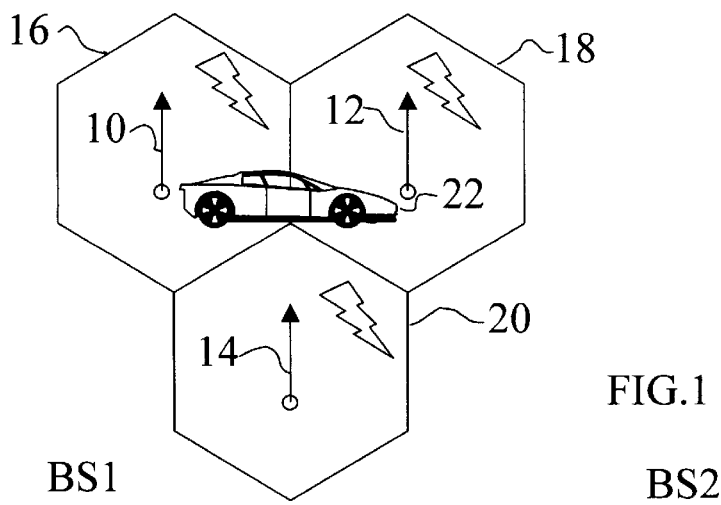
FIG. 1 is a schematic diagram of a conventional cellular communications system.

FIG. 1 is a schematic diagram of a cellular communications system. As shown in FIG. 1, the system includes three basestations 10, 12, and 14, and their respective hexagonal cell definitions 16, 18, and 20. (Those skilled in the art will appreciate that other cell geometries are also possible.) Also shown is a single mobile unit 22.

In accordance with conventional CDMA practice, signalling links (not shown) exist between the basestations 10, 12, and 14, allowing messages to be passed between basestations. These signalling messages may be passed directly between the basestations involved, or may be passed through an intermediary basestation controller (not shown). Basestation intelligence exists either on the basestations themselves or on the basestation controller if present.

During normal, non-handoff use, the mobile unit 22 maintains a CDMA communications link with a single basestation, thereby occupying a single basestation traffic channel. During 2-way handoff, the mobile unit 22 maintains communications links with two basestations, thereby occupying two basestation traffic channels. During 3-way handoff, the mobile maintains communications links with three basestations, thereby occupying three basestation traffic channels.

Each basestation transmits a pilot signal that identifies the basestation, and that is also used to indicate the signal strength available from that basestation. The mobile unit detects these pilot signals and measures the associated signal strengths. On the basis of the signal strength measurements, the mobile unit maintains lists of four pilot sets, referred to respectively as the Active Set, Candidate Set, Neighbor Set, and Remaining Set.

The pilots of the Active Set are associated with the traffic channels assigned to the mobile unit. In normal use, the Active Set contains a single pilot. During 2-way handoff, it contains two pilots, and during 3-way handoff, it contains three pilots.

The pilots of the Candidate Set are those which do not belong to the Active Set, but which have sufficient strength to indicate that an acceptable channel could be established between the basestation producing the candidate pilot and the mobile unit.

The pilots of the Neighbor Set are those belonging to 10 basestations in neighboring cells that do not belong to either the Active Set or the Candidate Set. Due to their physical proximity, they are the next likely candidates for handoff. The pilots of the Remaining Set are all the remaining possible pilots in the current CDMA system.

A conventional 2-way soft handoff occurs as follows. Initially, the mobile unit is in communication with a single basestation whose pilot P1 is in the Active Set, while monitoring the signal strengths of the pilots in the other sets.

When the mobile detects a pilot P2 that is currently in the Neighbor Set and whose strength exceeds a predetermined threshold, the mobile transfers the pilot P2 to the Candidate Set, and transmits a Pilot Strength Measurement Message on the existing reverse traffic channel.

The Pilot Strength Measurement Message contains the strengths of all qualified pilots, including pilots in the Active set and the new pilot P2. This message is received by the "old" basestation already communicating with the mobile unit and is passed to the basestation intelligence.

The basestation intelligence compares the pilot strength measurements contained in the message and determines that the pilot P2 is sufficiently strong to initiate 2-way soft handoff. A message indicating this fact is sent via the signalling links between the basestations to the "new" basestation transmitting P2. In response, the "new" basestation allocates a traffic channel. Both basestations send a Handoff Direction Message to the mobile.

Upon receiving these messages, the mobile transfers the pilot P2 to the Active Set, establishes an additional link on the newly allocated traffic channel of the "new" basestation and begins decoding the new channel.

Using reverse traffic channels, the mobile then sends a Handoff Completion Message to the basestations involved in the soft handoff. At this point, the mobile unit is communicating with two basestations, and is combining the signals received from the two basestations, thereby achieving space diversity.

Figure 2:
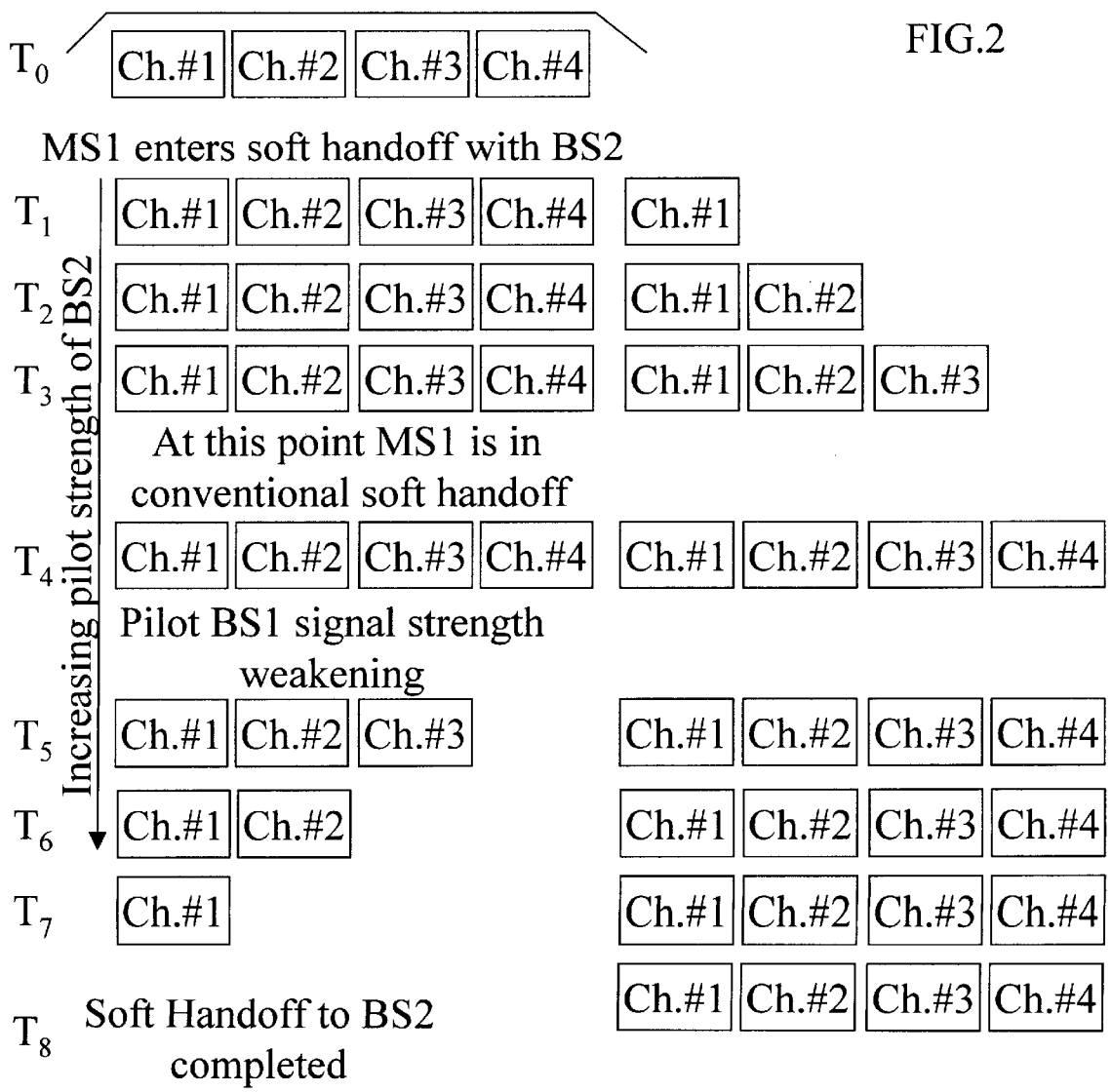
FIG. 2 is a flowchart of a progressive 2-way soft handoff method in accordance with the invention, that can be practiced in the cellular communications system of FIG. 1.

The progressive soft handoff of the present invention differs in a number of significant aspects from the conventional soft handoff discussed above. FIG. 2 is a flowchart depicting an example of progressive soft handoff in accordance with the invention, which optimizes bandwidth and processor utilization. The invention exploits the ability to "layer" the information signals, such as by using signal compression techniques, to optimize bandwidth and processor utilization during soft handoff.

In particular, the invention utilizes the fact that most telecommunicated digital signals, whether voice or data, are coded in some fashion. Voice CODECS such as CELP (codebook excited linear prediction), and video CODECS such as MPEG are widely employed in conventional digital telecommunications systems. Coded signals contain a plurality of information components or "layers" of different degrees of significance. Typically, the most significant component of the coded waveform is encoded by more powerful FEC (Forward Error Control) codes prior to transmission. The signal can be reconstructed from the most significant information component alone, with the additional layers or components of lower level information contributing progressively to the reconstruction detail.

The invention described herein with regard to FIG. 2 utilizes this "layered" or pyramidal nature of compressed digital information to minimize bandwidth utilization during soft handoff.

The flowchart of FIG. 2 is based upon the example of progressive 2-way soft handoff of a high-speed data application request, and the assumption that four (4) channels are employed to service the request. In the example shown, data transmission of the 4 channels is accomplished by Channel 1 carrying the most significant content of the data stream, while channels 2–4 carry the remaining information in descending order of importance.

As shown in FIG. 2, progressive 2-way soft handoff is initiated by maintaining the "original" data rate at the primary link (to BS1 in FIG. 2), while establishing the secondary link (BS2) at lower data rates. As the candidate (secondary) link's signal (BS2) becomes progressively stronger, and the primary link's signal (BS1) becomes weaker, the data rate at the primary link is progressively decreased, and the data rate at the secondary link is progressively increased to finally complete the soft handoff at the full, optimum data rate.

Referring to the "time slices" T0 through T8 shown in FIG. 2, at time T1, the lower data rate signal (BS2) contains only the most significant part of the coded waveform (carried on Channel #1 of BS2). As the candidate (secondary) link's signal (BS2) becomes progressively stronger (at times T2, T3, T4, . . . ), the data rate at the secondary link (BS2) is progressively increased to maintain full data rate (as in "conventional" soft handoff) at both links (BS1 and BS2). As shown in FIG. 2, the mobile unit (MS1) is in a "conventional" soft handoff mode at time T4.

As the primary link's signal (BS1) begins to weaken (at times T5, T6, T7), the data rate at the primary link is progressively decreased, to finally complete the soft handoff at the full (optimum) data rate (time T8 in FIG. 2).

Review of FIG. 2 shows how the invention minimizes processor requirements, while maintaining the diversity advantages of conventional soft handoff. In accordance with conventional CDMA practice, each channel's signal is processed by independent receivers in the mobile unit. At time T1, when the mobile enters the soft handoff condition, only the most significant information is transmitted on Channel 1 in the downlink. Only Channel 1's receiver processes the macro-diversity signals (from BS2), while Channels 2–4 retain processing of signals from BS1.

On the reverse link, the same principle applies, thereby optimizing processor usage. At time T1, when the mobile unit first enters progressive soft handoff with the target basestation (BS2), the BS can allocate only one radio channel to process Channel 1's received signal, and only Channel 1 will be diversity combined at the mobile switching controller (MSC). As BS2's pilot signal strength grows (times T2, T3, T4, . . . ), BS2 can start processing the other channels, thus providing processor savings.

The diversity benefits of conventional soft handoff are maintained by the invention. At the MSC, the combining of signals from the different BSCs associated with the mobile in soft handoff will continue. In this case (e.g., times T1 and T2), the combining will occur for the most significant information only, thus reducing processor utilization. At the mobile, where the receiver processes the macro-diversity signals from the two base stations, the same methodology is applied. As the bandwidth of the second connection progressively increases (times T2, T3, T4, . . . ), the diversity processing can be extended to the rest of the signal information.

The invention disclosed herein reduces the "true" soft handoff region for a CDMA system. A benefit of the progressive soft handoff described herein is that the effects of power fluctuations caused by wide bandwidth users entering or leaving the system during start and completion of soft handoff are minimized.

A further benefit ensues from reducing overall system interference, since a lower number of active channels results from the use of fewer active links during soft handoff.

Signalling requirements, which are affected by the need for the mobile unit to keep the basestation informed about the addition and/or release of channels, are reduced by the invention.

The invention thus optimizes bandwidth and processor utilization on both forward and reverse links (or up- and downlinks) during soft handoff, especially when wideband or high speed data communications are involved. As a result, a larger number of users can be accommodated in the given bandwidth. Simply put, the optimized use of resources enables higher traffic levels to be achieved by the system. Alternatively, for a given number of users, the interference observed by the users is reduced.

Further, the probability of a dropped call is reduced, due to reduced requirements at BS2 (FIG. 2), because the system does not require all of the resources of BS2 at an early time (e.g. T1, T2, . . . ) in the handoff.

The invention provides the most significant advantages with wideband (e.g., video) signals. It can also be extrapolated to speech, with lower than toll quality data rate transmission at the secondary base station.

The number of basestations in use during a given soft handoff can be minimized, and the usage of the base station controller/mobile switching center (BSC/MSC) link can be optimized.

The invention provides a reduction in the cost per user, since it enables a CDMA system to support a larger number of users. Further, the invention provides a reduction in infrastructure costs, due to a reduced need for processor over-provisioning at the base station. In addition, the invention provides better received signal quality, due to reduced interference.

Those skilled in the art will appreciate that the lower data rate transmission discussed herein can be achieved by employing known digital data compression and/or rate adaptation techniques. In effect, the lower data rate transmission is achieved by employing the segregation of "important" and "not-so-important" information, as occurs in conventional digital data compression processes. Rate adaptation and data compression methods are well-known, but have not hitherto been applied to optimize bandwidth utilization during soft handoff.

Those skilled in the art will appreciate that rate adaptation techniques are widely used in conventional CDMA systems during call setup and while on call. By way of example, there are several algorithms for progressive data transmission of video signals. Thus, a video transmission typically requiring a bandwidth of 2 Mb/s can be transmitted at lower granularity, e.g. 64 Kb/s. Data rates can also be altered by the known technique of code puncturing.

Those skilled in the art will appreciate that other implementations of the invention described herein are possible, and are within the scope of the invention. For example, while the invention has been described in terms of adding or releasing channels on the basis of the "important" and "not-so-important" parameter, the invention can also be practice using addition or release of channels based upon other characteristics of the data stream, such as content or bandwidth, or based upon the resources available at the second (or third) basestation. In each of these cases, the basic steps of adding and/or releasing channels is substantially the same as depicted in FIG. 2.

While 2-way soft handoff is discussed herein by way of example, the invention is equally applicable to 3-way soft handoff. In addition, while the example discussed herein utilizes the layered nature of digital data created by compression of a source signal, there are other ways to achieve the variable data rates noted herein. For example, the spreading ratio may be dynamically changed as required to optimize the bandwidth utilization in the process of soft handoff. By utilizing different spreading codes, the system can support different data rates. Alternatively, the data rates can be altered by code puncturing.

While FIG. 2 shows an example in which 4 channels are employed, those skilled in the art will appreciate that the invention can be practiced in conjunction with more or fewer channels. In addition, while FIG. 2 shows an example in which only one channel is added or released in each "time slice", more than one channel can be added or released at a time, depending upon processing requirements.

In addition, while FIG. 2 shows an example in which handoff is substantially "symmetrical," in that handoff is completed at substantially the same time for traffic in both directions, the invention can also be practiced with "asymmetric" handoff, in which one direction completes handoff before the other.

In a further practice of the invention, if BS2 does not offer all the processor and other resources that were provided by BS1, but the mobile unit has left the coverage of BS1's cell, then the system can selectively eliminate a channel of the call, such as by simply not allocating a selected channel thereto. By way of example, if BS1 of FIG. 1 offers 5 channels, while BS2 offers only 4, the system would selectively eliminate a channel of the call. In such a practice of the invention, the "eliminated" channel would preferably correspond to the least significant digital components of the call.

Moreover, while FIG. 2 depicts a "complete" handoff in that all communications is transferred to BS2, a circumstance may arise in which BS2 may not be able to provide all the resources that BS1 provided. Thus, in another practice of the invention, even after handoff, the call continues to be serviced by both BS1 and BS2. In one example of such an "incomplete" handoff, the most significant digital components would be handled by BS2 after handoff, while the least significant digital components would be handled by BS1 after handoff.

Progressive soft handoff in accordance with the invention can also be efficiently used in services composed of two or more substreams, each of which may have different needs, to improve reliability for the key substreams. The concept can also be extended to progressive call setup to avoid sudden introduction of a wideband user into the network.

It will thus be seen that the invention efficiently attains the objects set forth above, among those made apparent from the preceding description. In particular, the invention provides improved bandwidth and processor usage in CDMA systems.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A progressive soft handoff method for use in a CDMA telecommunications system having a plurality of basestations and a mobile unit in 2-way soft handoff communication with two of the basestations over first and second respective communications links, the first and second communications links carrying digital signals at respective data rates, the soft handoff method comprising the steps of:

1) at an initial time during 2-way soft handoff, maintaining a full data rate between the mobile unit and the first basestation, 2) at the initial time, establishing the second communications link at a data rate lower than the full data rate, 3) after the initial time and during 2-way soft handoff, progressively decreasing the data rate between the mobile unit and the first basestation, 4) after the initial time and during 2-way soft handoff, progressively increasing the data rate between the mobile unit and the second basestation, 5) at a termination time defining a termination of 2-way soft handoff, terminating communications between the mobile unit and the first basestation, 6) at the termination time, providing communications between the mobile unit and the second basestation at the full data rate, 7) thereby progressively transferring communications with the mobile unit to the second basestation.

2. The method of claim 1, wherein the step of maintaining a full data rate between the mobile unit and the first basestation at the initial time during 2-way soft handoff includes the step of providing multiple communications channels in the communications link between the mobile unit and the first basestation at the initial time, the step of progressively decreasing the data rate between the mobile unit and the first basestation includes the step of progressively releasing communications channels between the mobile unit and the first basestation, and the step of progressively increasing the data rate between the mobile unit and the second basestation includes the step of progressively adding, within the second data link, communications channels between the mobile unit and the second basestation.

3. The method of claim 2, wherein the step of providing multiple communications channels in the communications link between the mobile unit and the first basestation at the initial time includes the steps of encoding the digital signals communicated between the mobile unit and the first basestation into a plurality of digital data components including at least most-significant and least-significant digital data components, allocating at least one communications channel in the communications link between the mobile unit and the first basestation for carrying each of the digital data components, allocating for the most-significant digital data component at least a first communications channel in the communications link between the mobile unit and the first basestation, and wherein the step of progressively releasing communications channels between the mobile unit and the first basestation includes the steps of first releasing a communications channel carrying a least-significant data component, progressively releasing communications channels carrying progressively more-significant data components, until only the at least one communications channel carrying the most-significant data component remains, and at the termination time, releasing the at least one communications channel carrying the most-significant data component.

4. The method of claim 3, wherein the step of encoding the digital signals communicated between the mobile unit and the first basestation into a plurality of digital data components, including at least most-significant and less-significant digital data components, includes the step of applying data compression.

5. The method of claim 3, wherein the step of establishing the second communications link at a data rate lower than the full data rate includes the step of encoding the digital signals using digital data compression or rate adaptation.

6. The method of claim 3, wherein the step of establishing the second communications link at a data rate lower than the full data rate includes the step of applying code puncturing.

7. The method of claim 3, wherein the step of establishing the second communications link at a data rate lower than the full data rate includes the step of applying different spreading codes.

8. The method of claim 3, wherein the step of establishing the second communications link includes the step of selectively eliminating, at the second basestation, at least one communications channel of the call.

9. The method of claim 8, wherein the step of selectively eliminating, at the second basestation, at least one communications channel of the call, includes the step of eliminating at least one communications channel carrying a less-significant digital data component.

10. A progressive soft handoff method for use in a CDMA telecommunications system having a plurality of basestations and a mobile unit in 3-way soft handoff communication with three of the basestations over first, second and third respective communications links, the first, second and third communications links carrying digital signals at respective data rates, the soft handoff method comprising the steps of:

1) at an initial time during 3-way soft handoff, maintaining a full data rate between the mobile unit and the first basestation, 2) at the initial time, establishing the second and third communications links at data rates lower than the full data rate, 3) after the initial time and during 3-way soft handoff, progressively decreasing the data rate between the mobile unit and the first basestation, 4) after the initial time and during 3-way soft handoff, progressively increasing the respective data rates between the mobile unit and the second and third basestations, 5) at a termination time defining a termination of 3-way soft handoff, terminating communications between the mobile unit and the first basestation, 6) at the termination time, providing communications between the mobile unit and one of the second or third basestations at the full data rate, 7) thereby progressively transferring communications with the mobile unit to one of the second or third basestations.

* * * * *